(12) United States Patent
Holleczek et al.

(10) Patent No.: US 11,480,663 B2
(45) Date of Patent: Oct. 25, 2022

(54) LIGHT TRANSMISSION ELEMENT, OPTICAL RECEIVING UNIT, OPTICAL ACTUATOR UNIT, LIDAR SYSTEM, WORKING DEVICE AND VEHICLE

(71) Applicant: Robert Bosch GmbH, Stuttgart (DE)

(72) Inventors: Annemarie Holleczek, Stuttgart (DE); Mustafa Kamil, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 564 days.

(21) Appl. No.: 16/499,926

(22) PCT Filed: Mar. 27, 2018

(86) PCT No.: PCT/EP2018/057787
§ 371 (c)(1),
(2) Date: Oct. 1, 2019

(87) PCT Pub. No.: WO2018/184918
PCT Pub. Date: Oct. 11, 2018

(65) Prior Publication Data
US 2020/0057144 A1 Feb. 20, 2020

(30) Foreign Application Priority Data
Apr. 6, 2017 (DE) .......................... 102017205844.7

(51) Int. Cl.
*G01C 3/08* (2006.01)
*G01S 7/486* (2020.01)
(Continued)

(52) U.S. Cl.
CPC .............. *G01S 7/486* (2013.01); *G01S 17/06* (2013.01); *G02B 19/0019* (2013.01)

(58) Field of Classification Search
CPC ...... G01S 7/486; G01S 17/06; G02B 19/0019
See application file for complete search history.

(56) References Cited

U.S. PATENT DOCUMENTS 7,253,955 B2 *  8/2007  Watanabe .............. G03B 21/62
                                                        359/457
7,713,611 B2 *  5/2010  Kim ...................... H01J 29/867
                                                        428/156

(Continued)

FOREIGN PATENT DOCUMENTS

EP    3045936 A1     7/2016
JP    2001237405 A   8/2001

(Continued)

OTHER PUBLICATIONS

International Search Report for PCT/EP2018/057787, dated Jul. 10, 2018.

*Primary Examiner* — Mark Hellner
(74) *Attorney, Agent, or Firm* — Norton Rose Fulbright US LLP; Gerard Messina

(57) ABSTRACT

A light transmission element for an optical unit for transmitting and, in the process, adapting the angle of transmitted light, including a sequence of a multitude of optical elements situated in the form of a layer, in which the layer forms a first side and a second side, which face away from one another, a respective optical element including a pair of subelements, which each extend from a geometrically essentially identical base in a tapering manner and which face one another with their bases and extend with different lengths along their taper, and the optical elements being aligned in such a way that subelements having a greater length face the first side and subelements having a lesser length face the second side.

9 Claims, 5 Drawing Sheets

(51) Int. Cl.
   *G01S 17/06*     (2006.01)
   *G02B 19/00*     (2006.01)

(56) References Cited

U.S. PATENT DOCUMENTS

| | | |
|---|---|---|
| 2007/0228914 A1 | 10/2007 | Kim et al. |
| 2010/0090595 A1 | 4/2010 | Nomura et al. |

FOREIGN PATENT DOCUMENTS

| | | | |
|---|---|---|---|
| JP | 2003243639 A | | 8/2003 |
| JP | 2004012918 A | | 1/2004 |
| JP | 2007095792 A | | 4/2007 |
| JP | 2009514709 A | | 4/2009 |
| JP | 2010212280 A | * | 9/2010 |
| WO | 2008020514 A1 | | 2/2008 |
| WO | 2013145433 A1 | | 10/2013 |

\* cited by examiner

LIGHT TRANSMISSION ELEMENT, OPTICAL RECEIVING UNIT, OPTICAL ACTUATOR UNIT, LIDAR SYSTEM, WORKING DEVICE AND VEHICLE

FIELD OF THE INVENTION

The present invention relates to a light transmission element for an optical unit, to an optical receiving or actuator unit, to a LIDAR system, and to a working device and, in particular, to a vehicle.

BACKGROUND INFORMATION

In many technical applications, wavelength filters are used in optical receiving units or also in emitters, provided upstream in the optical path, to limit the spectrum to be received or to be emitted. It is known that such wavelength filters frequently have a transmission window dependent on the actual angle of incidence of the radiation with respect to the position and width of the window in the spectrum. Conversely, this means that, under unfavorable circumstances, i.e., in the case of large angles of incidence in comparison to the axis of incidence, the filter properties may deviate from the setpoint values. In other optical applications as well, large angles of incidence in relation to the axis of incidence result in an undesirable behavior of the overall optical arrangement. On the other hand, large angles of incidence are desirable with respect to a high degree of light efficiency. Reconciling the two aspects with one another presents a major technical challenge and has previously required comparatively complex optical systems to meet these challenges.

SUMMARY OF THE INVENTION

The light transmission element according to the present invention having the features described herein has the advantage that an optical arrangement may be achieved in a beam path using a simple arrangement and an angle adaptation of transmitted light, or of electromagnetic radiation in general, may be achieved in a particularly loss-free manner. According to the present invention, this is achieved by the features described herein in that a light transmission element is created, and in particular for an optical unit or of an optical unit and, in particular, for an optical receiving unit or for an optical emission or actuator unit for transmission and, in the process, angle adaptation of transmitted electromagnetic radiation and, in particular, of light and/or infrared radiation. The light transmission element is configured and situated in the form of a layer and includes a sequence of a multitude of optical elements. The layer includes a first side or upper side and a second side or lower side, or forms these, which face away from one another and, in particular, face a first half-space or a second half-space. A respective optical element includes a pair of subelements, which each extend from a geometrically substantially analogous or identical base in a tapering manner and which face one another with their bases and, in particular, abut one another and extend with differing lengths along their taper. The optical elements are aligned in such a way that subelements having a greater length face the first side or upper side, and subelements having a lesser length face the second side or lower side. As a result of the measures provided according to the present invention, an angle adaptation of a transmitted beam in comparison to the incident beam is achieved for all incident beams which exceed a particular angle in comparison to the axis of incidence, due to a multiple reflection on adjoining optical elements.

This means that a transmission further toward the axis of the underlying optical surface is achieved for beams incident in a particularly flat manner from the first side. This case is relevant for receiver arrangements and the like. Conversely, this means that beams incident from the second side, if necessary in comparison to the angle of incidence, may be transmitted at a larger angle to the axis of the underlying optical surface. This situation is relevant for emitter arrangements in which a beam-fanning or more pronounced distribution of the radiation is desired.

In other words, one aspect of the present invention is to configuration a moth-eye structure including a multitude of optical elements which are situated in a lattice-like manner and extend conically or in a tapering manner, pointing away from one another with their conical or tapered areas, and which are aligned in parallel to one another.

The further descriptions show further refinements of the present invention.

Different options lend themselves for the configurations of the layer including the sequence of the optical elements, which may advantageously also each be selected as a function of the application.

In one specific embodiment of the light transmission element according to the present invention, the layer including the sequence of optical elements is configured in the form of a monolayer of optical elements. Specifically, this means that the optical elements are not situated on top of one another in multiple layers.

As an alternative, however, multi-layer configurations are also conceivable.

It is also possible to geometrically adapt the shape of the light transmission element and, in particular, the shape of the layer of the optical elements to the requirements of the respective application.

Particularly simple conditions, however, arise when the layer is formed in a surface or plane, and in particular in a planar manner.

The optical elements themselves and, in particular, the respective subelements may have differing geometrical configurations and be combined in different ways with one another.

For example, the optical elements and, in particular, the subelements may be configured identically with respect to one another, geometrically and/or materially.

In another additional or alternative embodiment of the light transmission element according to the present invention, the optical elements may be configured in the form of a double cone and/or of a double pyramid.

This may be achieved, in particular, when the subelements are each configured as a, in particular perpendicular, cone or truncated cone and/or as an, in particular perpendicular, pyramid or truncated pyramid.

Different embodiments also lend themselves from a material point of view.

Particularly simple conditions arise when the optical elements are configured in one piece or material-integrally.

Even though many materials intrinsically have a high reflectance, the optical properties of the individual optical elements may be further enhanced by appropriate material configurations. For example, PC, PMMA, Zeonex or transmitting plastic materials in general lend themselves as materials.

In another advantageous refinement of the light transmission element according to the present invention, it is provided, for example, that the optical elements and, in particular, the subelements include a jacket, whose surface area is configured to be reflective, in particular with the aid of a reflective layer or coating.

An optically particularly advantageous optical behavior of the light transmission element according to the present invention arises when the optical elements and, in particular, the subelements, at least locally or overall, are aligned identically with respect to one another, in particular, locally or overall, are aligned perpendicularly to the first side and/or to the second side, and/or in parallel to one another, in particular in relation to their body axes.

As an alternative or in addition, the higher-level arrangement of the multitude of optical elements within the layer may be appropriately configured to advantageously configure the optical properties of the light transmission element.

It may be provided, for example, that the optical elements are situated in the layer in the form of a, in particular perpendicular, lattice.

As an alternative thereto, an arrangement is conceivable in which the optical elements in the layer are situated in the form of a, in particular perpendicular, lattice and, additionally, in the form of a dual lattice, for example in the form of a very dense packing.

As was already mentioned above, an arrangement in bulk, for example a multi-layer arrangement, is also conceivable. However, a particularly simple structure results when the optical elements are situated two-dimensionally. The arrangement as a monolayer was already mentioned above.

The present invention furthermore relates to an optical receiving unit, in particular a filter and/or a sensor which include(s) a light transmission element according to the present invention.

The light entry area of the optical receiving unit may be formed by the first side of the underlying light transmission element.

In addition or as an alternative, a light exit area of the optical receiving unit may be formed by the second side of the light transmission element.

The object of the present invention furthermore is an optical actuator unit, and in particular an emitter for electromagnetic radiation, which includes or include a light transmission element according to the present invention.

There, a light entry area may advantageously be formed by the second side of the underlying light transmission element. In addition or as an alternative, a light exit area may be formed or is formed by the first side of the underlying light transmission element.

Furthermore, according to another aspect of the present invention, a LIDAR system is also created, which is configured with a transmitter lens system for emitting light into a field of vision and with a receiver lens system for receiving light from the field of vision, the transmitter lens system and/or the receiver lens system including a light transmission element according to the present invention, in particular in the form of an optical actuator unit or in the form of an optical receiving unit.

Finally, the object of the present invention is also a working device, which is configured with a LIDAR system according to the present invention.

The working device may, in particular, be a vehicle.

With reference to the accompanying figures, specific embodiments of the present invention are described in greater detail.

DETAILED DESCRIPTION

Figure 1:
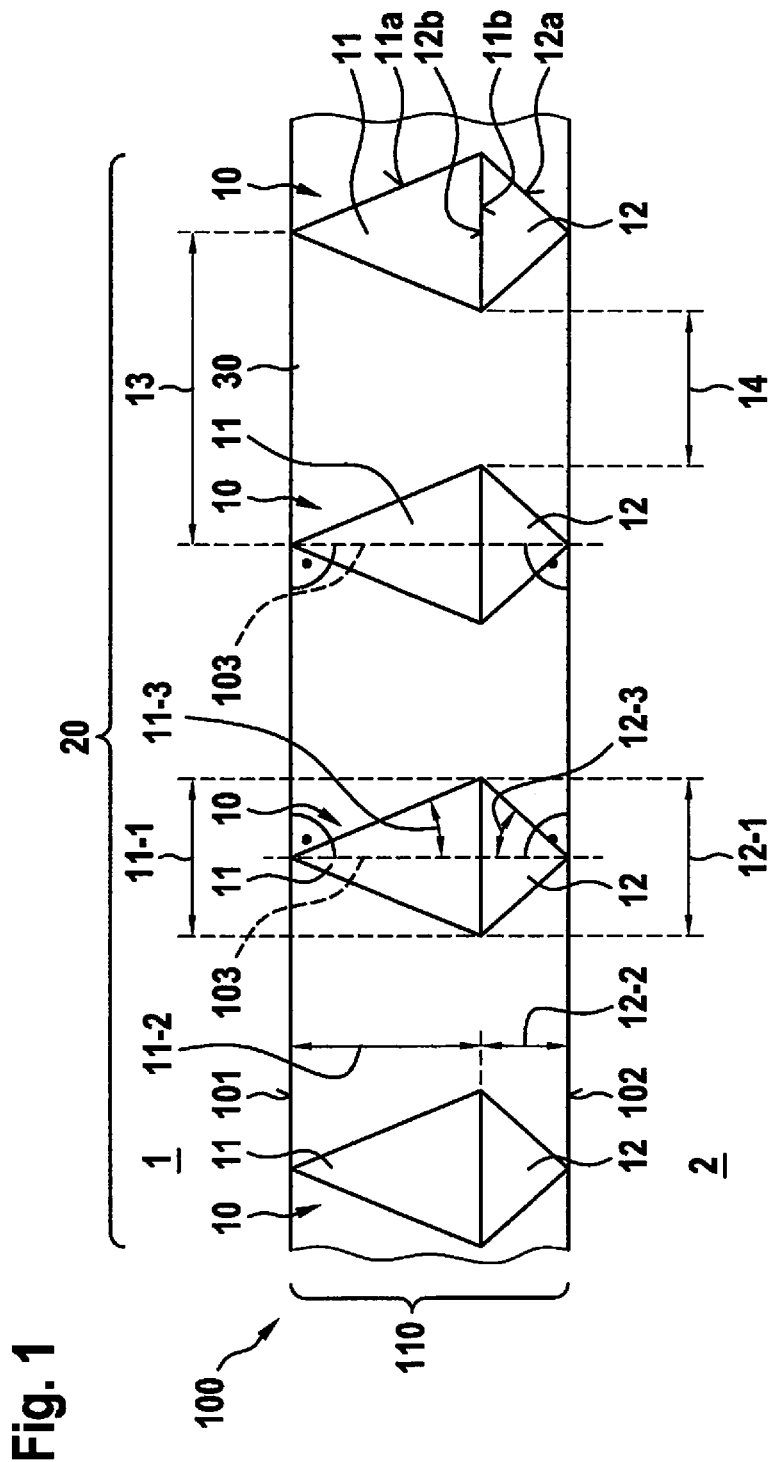
FIG. 1 shows a schematic side view of a first specific embodiment of the light transmission element according to the present invention.

With reference to FIGS. 1 through 5, exemplary embodiments of the present invention and the technical background are described hereafter in greater detail. Identical and equivalent as well as identically or equivalently acting elements and components are denoted by the same reference numerals. The detailed description of the denoted elements and components is not provided each time they occur.

The shown features and further properties may be arbitrarily separated from one another and arbitrarily combined with one another, without departing from the core of the present invention.

FIG. 1 shows a schematic side view of a first specific embodiment of the light transmission element 100 according to the present invention.

Light transmission element 100 according to FIG. 1 configured according to the present invention is made up of an arrangement 20 of a multitude of optical elements 10, which are configured in the form of a double pyramid or a double cone and are thus made up of a first subelement 11 including a base 11b and a jacket 11a, and a second subelement 12 including a base 12b and a jacket 12a, which have identical bases 11b and 12b and which face one another and, in particular, are connected to one another with their bases 11b, 12b.

Optical elements 10 are situated in one plane, essentially form a layer 110, and divide the entire space into a first or upper half-space or a first or upper side 1, and into a second or lower half-space or a second or lower side 2. A first or upper side 101 of layer 110 faces the first half-space or first side 1, whereas a second or lower side 102 faces the second half-space or second side 2 of the space.

Base 11b of first subelement 11 has a width or a diameter 11-1. Base 12b of second subelement 12 has a width or a diameter 12-1.

First subelement 11 and second subelement 12 are narrow, proceeding from the respective base 11b, 12b and they are tapering. First subelement 11 has a length 11-2 in the direction of its taper. Second subelement 12 has a length 12-2 in the direction of its taper. The taper may either be described by the ratio of width 11-1, 12-1 or of the diameter of the respective base 11b, 12b to length 11-2, 12-2 in the direction of the taper. As an alternative thereto, aperture angle 11-3 and 12-3 on the tip situated opposite the respective base 11b, 12b may be indicated, and in particular with respect to axis 103 to first or upper side 101 and/or to second or lower side 102.

In the specific embodiment of light transmission element 100 shown in FIG. 1, optical elements 10 are embedded in a carrier 30. As a result of this embedding 30, the optical elements are mechanically stabilized with respect to one another in their position and orientation. The embedding into a carrier 30 is not mandatory overall. The embedding into carrier material 30 may also take place only partially, i.e., does not fill the space, for example as a very thin material layer or as thin threads between optical elements 10. The embedding in a carrier 30 may also be entirely dispensed with, for example when a fixation in the lower area of second optical subelements 12, for example on their tips, is possible.

In the specific embodiment according to FIG. 1, first and second subelements 11 and 12 of a respective optical element 10 have mutually aligned figure axes, which coincide with the local axis 103 on first and second sides 101 and 102 of layer 110 of light transmission element 100. However, this arrangement is not mandatory. It is also possible to select other orientations of the figure axes with respect to one another and in relation to axis 103, also locally, as a function of the application.

Figure 2:
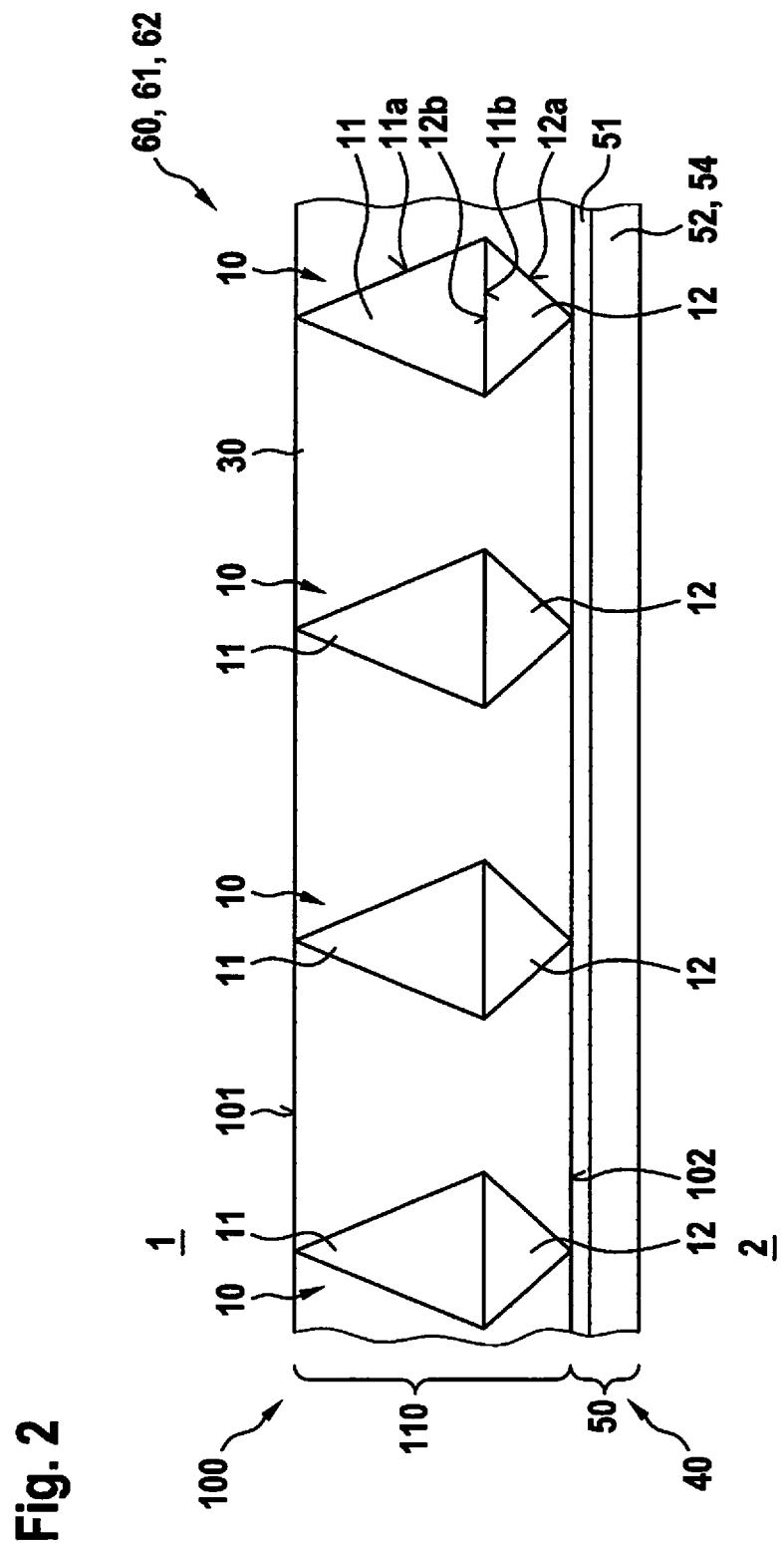
FIG. 2 shows a schematic side view of the specific embodiment of the light transmission element according to the present invention from FIG. 1 in connection with an optical arrangement.

FIG. 2 shows a schematic side view of the specific embodiment of light transmission element 100 according to the present invention from FIG. 1 in connection with a unit 50 according to the present invention as part of an optical arrangement 60.

In the specific embodiment according to FIG. 2, the arrangement of light transmission element 100 from FIG. 1 is applied to an optical unit 50, provided optically upstream. Optical unit 50 is made up of a filter layer 51 following lower side 102 of layer 110. It may be adjoined by a sensor layer 52. With such an arrangement, light incident from first half-space 1 is transmitted through light transmission element 100, an angle of incidence of a respective light beam being adapted in a reduced manner toward local axis 103, as is described in detail below. By adapting the angle of incidence, the acceptance ranges of the optically downstream filter layer 51 and/or of sensor layer 52 may be better utilized. Conversely, this results in a lower or even diminishing shift of the transmission window of filter layer 51 or of the detection window of sensor layer 52.

In addition, filter layer 51 and sensor layer 52 act as— possibly alternative or additional—carrier 40 for the individual optical elements 10 of light transmission element 100.

Sensor layer 52 may be replaced by an emitter layer 54 to form an optical actuator unit, in which emitter layer 54 emits light, whose emission angle range is widened after passing through light transmission element 100.

Figure 3:
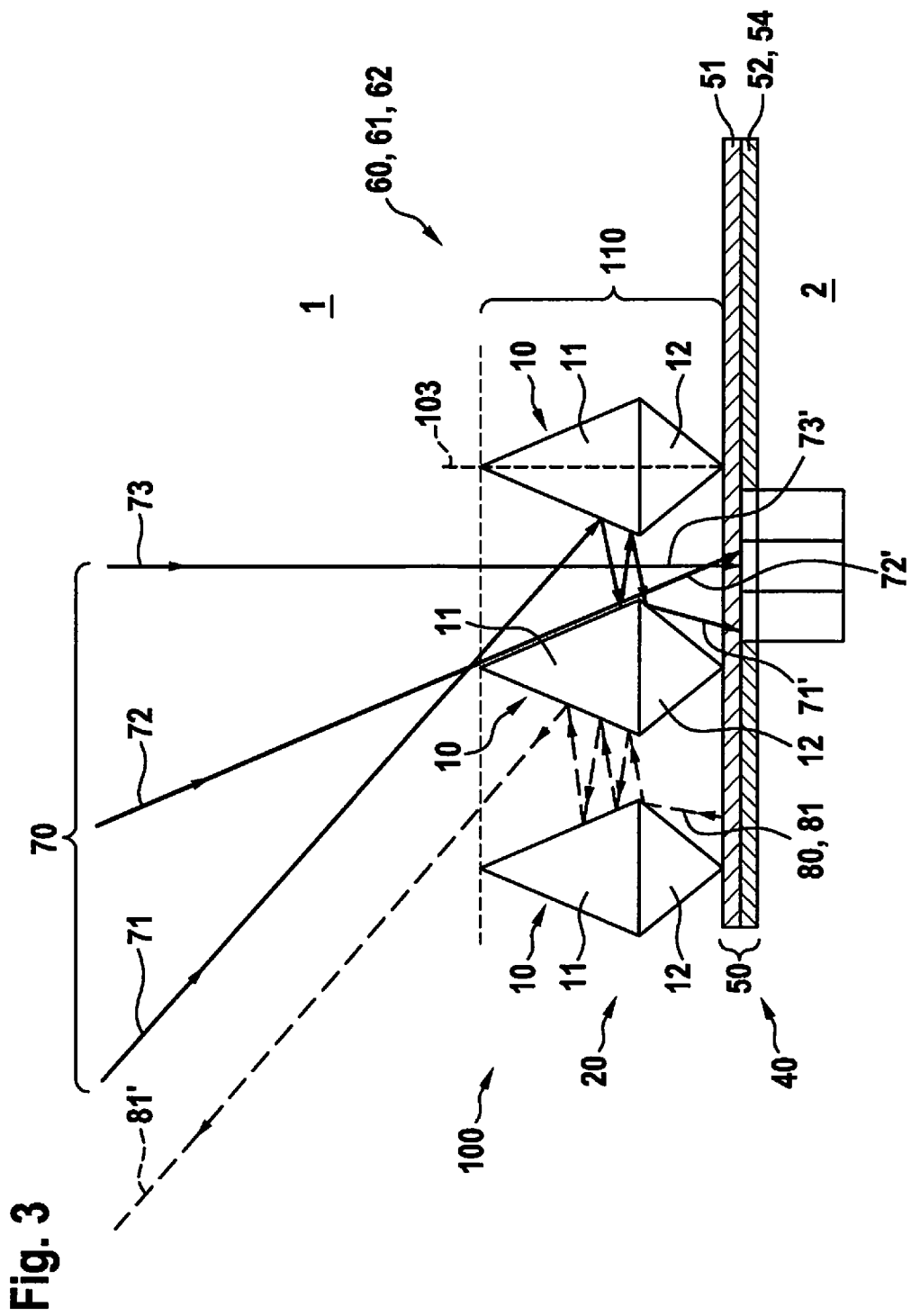
FIGS. 3, 4 and 5 show schematic side views of other specific embodiments of the light transmission element according to the present invention in respective applications.
Figure 4:
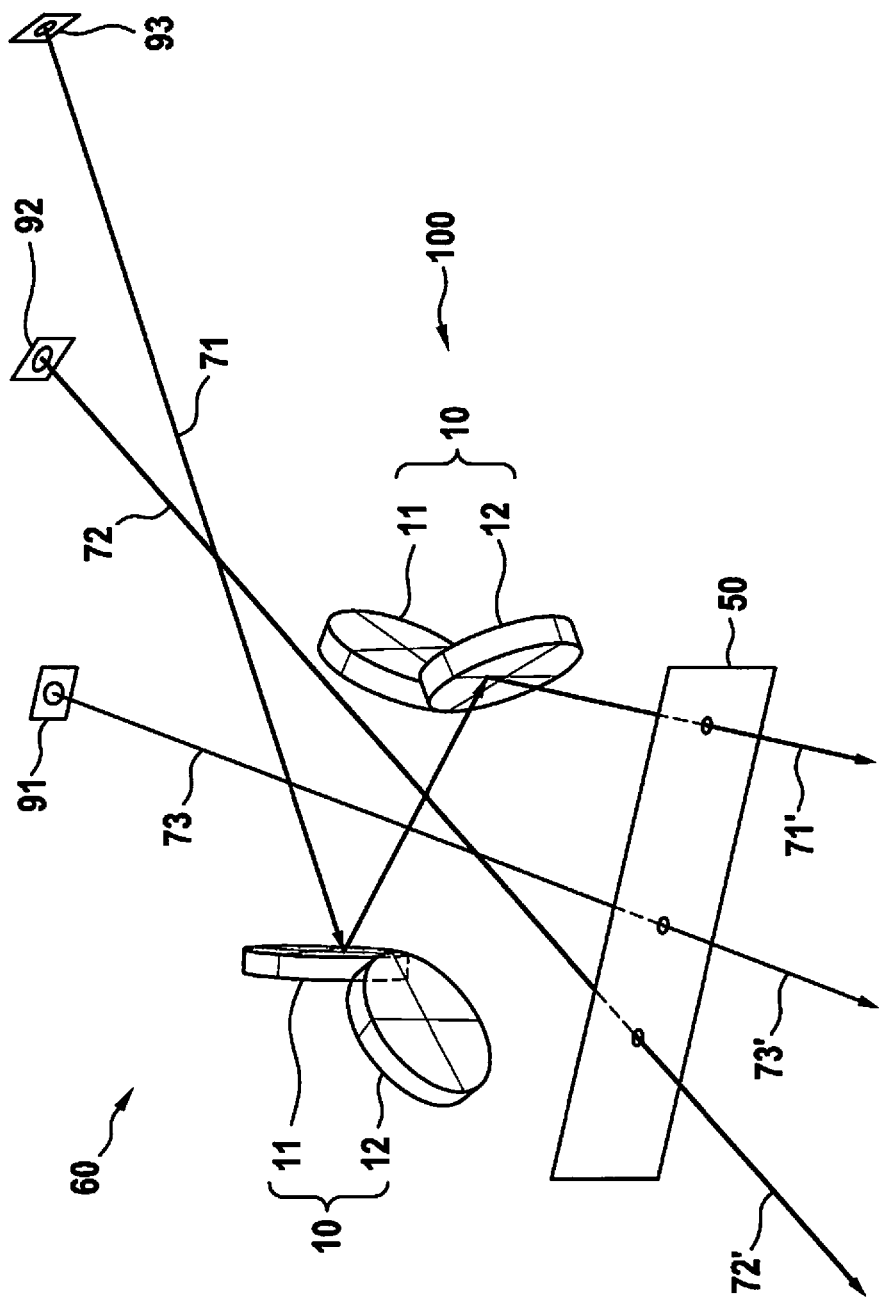
Figure 5:
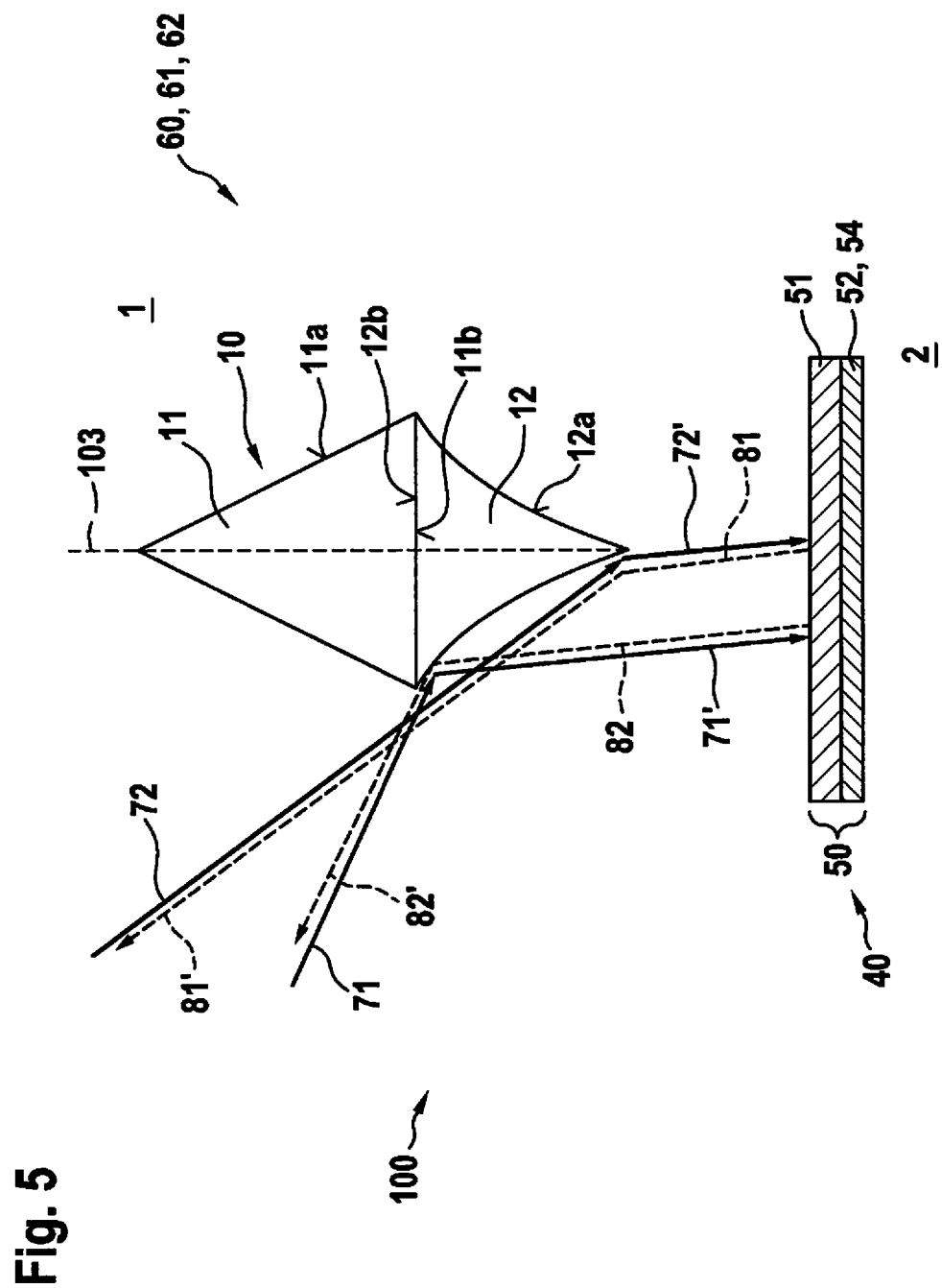

FIGS. 3 through 5 show schematic side views of other specific embodiments of light transmission element 100 according to the present invention in respective applications of optical units 50 and the corresponding optical arrangements 60.

The embodiment of light transmission element 100 according to the present invention which is shown in FIG. 3 also describes the application in connection with an optical arrangement 60 which may be configured as an optical receiving unit 61, namely when using a sensor layer 52, or as an optical actuator unit 62, namely when using an emitter layer 54 in the configuration of optical unit 50.

Shown are individual externally incident light beams 71, 72 and 73 of externally incident light 70, and in particular as a function of the actual angle of incidence compared to the orientation of optical elements 10 and of axis 103 with respect to layer 110, externally incident light beams 71, 72, 73 being different with arrangement 20 of optical elements 10.

Comparatively flat incident first beam 71 interacts with directly adjoining optical elements 10 in the form of a multiple reflection, consequently impacting as a transmitted beam optical unit 50 and, in particular, on filter layer 51 at a lower angle of incidence in relation to axis 103.

Second externally incoming light beam 72 is incident at an angle of incidence in relation to axis 103 which corresponds to the aperture angle of upper subelement 11 of optical element 10. In the case shown here, beam 72 does not impact any of optical elements 10 and, without interaction, reaches directly filter layer 51 of optical unit 50.

Externally incoming beam 73 runs in parallel to axis 103 and directly between two directly adjoining optical elements 10, and thus also impacts filter layer 51 without interaction.

During operation of optical unit 50 including emitter layer 54, i.e., when optical arrangement 60 is configured as an optical actuator unit 62, for example as an emitter, a light beam 81 originating from an internal emission is imitated, first impacts second subelement 12 of an optical element 10 and then, after a multiple reflection between two directly adjoining optical elements 10, returns into first half-space 1 as an externally transmitted beam 81'.

The arrangement according to FIG. 4 shows embodiments of optical elements 10 deviating from the double cone shape. Depending on the angle of incidence in relation to axis 103, externally incoming light beams 71, 72 and 73 originating from external light sources 91, 92, 93 experience different forms of the interaction with first and second subelements 11, 12 of optical elements 10, to finally impact optical unit 50 as transmitted beams 71', 72' and 73'.

In the specific embodiment according to FIG. 5, second subelements 12 of optical elements 10 include a jacket 12a, which has a concave configuration. In this way, an improved angular adaptation of externally incident beams 71 and 72 into transmitted beams 71', 72', or of incoming beams 81, 82 after internal emission into externally exiting beams 81', 82', may be achieved.

FIG. 2 shows a schematic side view of the specific embodiment of light transmission element 100 according to the present invention from FIG. 1 in connection with a unit 50 according to the present invention as part of an optical arrangement 60.

These and further features and properties of the present invention are described hereafter based on the following explanations:

The present invention relates, in particular, also to an optical structure for minimizing the angle of impact of incident light beams in an expanded angle acceptance range.

Moth-eye structures for increasing the optical absorption on surfaces, e.g., in the case of black silicon detectors or in the case of anti-reflection coatings, are known per se and are used as comparatively cost-intensive optical wavelength filters for larger acceptance angles, or as cost-effective optical wavelength filters for small acceptance angles, in particular with a widening and shift of the transmission window in the case of larger angles.

It is an object of the present invention to create a minimization of the angle of impact of incident light beams in the case of a large angle acceptance range using a simple arrangement.

Advantages arising from the present invention:

the use of cost-effective optical wavelength filters in the case of large angles of incidence with an at most minor undesirable widening and shift of the transmission window over an angle of incidence reduced by the structure;

an at most minor loss of power in the case of unfavorable angles of incidence and incidence positions on the structure with far rarer unfavorable cases compared to the likelihood of favorable cases in which the functional principle applies;

the feasibility as a larger macrostructure or as a miniaturized microstructure, further miniaturizations only being limited by diffraction effects starting at approximately three times the wavelength, with a resulting scalability of the arrangement; and the option of assembling subimages on a sensor, while preserving an imaging angular ratio.

Element structures from the related art, which is geared toward natural moth eyes as absorption structures and is used in various shapes and sizes for many technical applications, are expanded by an additional and lower element half, so that the structure of a double cone or of a double pyramid results for each element, in particular perpendicularly to the surface of the optically active layer, and in particular in each case with a cone axis or pyramid axis perpendicular to the surface of the optically active layer.

Both upper and lower element halves 11, 12 may be configured as a reflective surface or with a reflective surface for the entire structure. Ideally, this results in a three-dimensional structure made up of a large number of individual elements 10, which cover a two-dimensional—which may be reflective—surface.

Upper, inclined element half 11 continues to be used to trap a maximum light intensity, the angle of an incident light beam becoming increasingly larger from an angle which is large with respect to the axis due to the multiple reflections.

Second or lower element half 12 is used for an angle reduction at the end of the reflection chain by a changed-sign slope in relation to axis 103 which is pronounced toward upper element half 11.

Optical filter 51 and sensor 52 are attached directly at the end of lower element half 12 for an imaging process, so that the beams coming in from larger angular ranges are separated without overlap from those which impact filter 51 without deflection.

A separate processing of sensor subimages allows a digital assembly of an overall image, e.g., for the use of an optical sensor system, such as in a LIDAR system.

The optimization parameters described hereafter may be configured so that no back reflection to the external light source occurs over a maximum angular range, but an inward deflection to the detector side takes place.

As a function of the respective application, the following parameters may be optimized:

horizontal distance 13, 14 of directly adjoining structural elements 10 vertical lengths 11-2, 12-2 and the length ratio of upper to lower element halves 11, 12 angle of inclination 11-3 of upper element half 11 angle of inclination 12-3 of lower element half 12 shaping of lower element half 12

Individual elements 10 may either be applied to a filter 51 and/or a sensor 52 and fixed thereby or, as an alternative, may be held together by another plane 30, which connects the elements horizontally and has a very high transmission, for example also by a transparent embedding material 30.

FIG. 3 schematically explains the two-dimensional functional principle based on the example of one specific embodiment of optically effective layer 110 according to the present invention, interpreted as light transmission element 100, based on three light beams 71, 72, 73 incident from upper half-space 1 having different angles of incidence.

FIG. 4 schematically explains the three-dimensional functional principle based on the example of another specific embodiment of optically effective layer 110 according to the present invention, interpreted as light transmission element 100 according to the present invention, based on three light beams 71, 72, 73 incident from upper half-space 1 having different angles of incidence.

FIG. 5 schematically explains another specific embodiment of optically effective layer 110 according to the present invention, interpreted as light transmission element 100 according to the present invention, in which a deviation occurs from strictly planar space interfaces or jacket areas 12a on second or lower subelement 12, and instead concave interfaces or jacket areas 12a having a continuously varying interface angle are used.

The size of optical elements 10 may be macroscopically in the range of millimeters or centimeters, and in particular having a microscopic structure in the range of nanometers or micrometers, for example in the case of an all-around attachment in front of a LIDAR cover window. A small overlay in front of the actual filter in the vicinity of the detector is conceivable. Possible manufacturing methods are, for example, injection molding, MEMS and nano manufacturing.

What is claimed is:

1. A light transmission element for an optical unit for transmitting and adapting the angle of transmitted light, comprising:
    a sequence of multiple optical elements situated in the form of a layer, wherein the layer forms a first side and a second side, which face away from one another; and
    a respective optical element, including a pair of subelements which each extend from a geometrically essentially identical base in a tapering manner and which face one another with their bases and extend with different lengths along their taper;
    wherein the optical elements are aligned so that subelements having a greater length face the first side, and so that subelements having a lesser length face the second side;
    wherein the optical elements and the subelements include a jacket, whose surface area is configured to be reflective, in particular with the aid of a reflective layer or coating.

2. The light transmission element of claim 1, wherein: (i) the layer, including the sequence of optical elements is in the form of a monolayer of optical elements, and/or (ii) the layer is formed in a surface, or a plane, or a planar manner.

3. The light transmission element of claim 1, wherein:
    (i) the optical elements and, in particular, the subelements among one another are configured identically with respect to one another, geometrically and/or materially; and/or
    (ii) the optical elements are configured in the form of a double cone and/or a double pyramid; and/or
    (iii) the subelements are each configured as a cone or truncated cone; and/or
    (iv) the subelements are each configured as a perpendicular pyramid or a perpendicular truncated pyramid; and/or
    (v) the optical elements are configured in one piece or material-integrally.

4. The light transmission element of claim 1, wherein:
    the optical elements and the subelements are aligned identically with respect to one another; and/or
    (ii) the optical elements and the subelements are aligned perpendicularly to the first side and/or to the second side; and/or
    (iii) the optical elements and the subelements are in parallel to one another, in particular in relation to their body axes.

5. The light transmission element of claim 1, wherein:
    (i) the optical elements are situated in the layer in the form of a perpendicular lattice;
    (ii) the optical elements are situated in the layer in the form of a perpendicular lattice and in the form of a dual lattice; and/or
    (iii) the optical elements are situated two-dimensionally.

6. An optical receiving unit, comprising:
a filter and/or a sensor including a light transmission element;
wherein the light transmission element includes:
- a sequence of multiple optical elements situated in the form of a layer, wherein the layer forms a first side and a second side, which face away from one another; and
- a respective optical element, including a pair of subelements which each extend from a geometrically essentially identical base in a tapering manner and which face one another with their bases and extend with different lengths along their taper, wherein the optical elements are aligned so that subelements having a greater length face the first side, and so that subelements having a lesser length face the second side;

wherein a light entry area is formed by the first side of the light transmission element and/or a light exit area is formed by the second side of the light transmission element;
wherein the optical elements and the subelements include a jacket, whose surface area is configured to be reflective, in particular with the aid of a reflective layer or coating.

7. An optical actuator unit, in particular an emitter for electromagnetic radiation, comprising:
a light transmission element, wherein the light transmission element includes:
- a sequence of multiple optical elements situated in the form of a layer, wherein the layer forms a first side and a second side, which face away from one another; and
- a respective optical element, including a pair of subelements which each extend from a geometrically essentially identical base in a tapering manner and which face one another with their bases and extend with different lengths along their taper, wherein the optical elements are aligned so that subelements having a greater length face the first side, and so that subelements having a lesser length face the second side;

wherein a light entry area is formed by the second side of the light transmission element and/or a light exit area is formed by the first side of the light transmission element;
wherein the optical elements and the subelements include a jacket, whose surface area is configured to be reflective, in particular with the aid of a reflective layer or coating.

8. A LIDAR system, comprising:
a transmitter lens system for emitting light into a field of vision and a receiver lens system for receiving light from the field of vision;
wherein the transmitter lens system and/or the receiver lens system includes a light transmission element in the form of an optical actuator unit or an optical receiving unit;
wherein the optical receiving unit includes:
a filter and/or a sensor including a light transmission element;
wherein the light transmission element includes:
- a sequence of multiple optical elements situated in the form of a layer, wherein the layer forms a first side and a second side, which face away from one another; and
- a respective optical element, including a pair of subelements which each extend from a geometrically essentially identical base in a tapering manner and which face one another with their bases and extend with different lengths along their taper, wherein the optical elements are aligned so that subelements having a greater length face the first side, and so that subelements having a lesser length face the second side, wherein a light entry area is formed by the first side of the light transmission element and/or a light exit area is formed by the second side of the light transmission element; and wherein the optical actuator unit includes:
a light transmission element, wherein the light transmission element includes:
- the sequence of multiple optical elements situated in the form of the layer, wherein the layer forms the first side and the second side, which face away from one another; and
- the respective optical element, including the pair of subelements which each extend from a geometrically essentially identical base in a tapering manner and which face one another with their bases and extend with different lengths along their taper, wherein the optical elements are aligned so that subelements having the greater length face the first side, and so that subelements having the lesser length face the second side;

wherein the light entry area is formed by the second side of the light transmission element and/or the light exit area is formed by the first side of the light transmission element.

9. A working device and/or a vehicle, comprising:
a LIDAR system, including:
a transmitter lens system for emitting light into a field of vision and a receiver lens system for receiving light from the field of vision;
wherein the transmitter lens system and/or the receiver lens system includes a light transmission element in the form of an optical actuator unit or an optical receiving unit;
wherein the optical receiving unit includes:
a filter and/or a sensor including a light transmission element;
wherein the light transmission element includes:
- a sequence of multiple optical elements situated in the form of a layer, wherein the layer forms a first side and a second side, which face away from one another; and
- a respective optical element, including a pair of subelements which each extend from a geometrically essentially identical base in a tapering manner and which face one another with their bases and extend with different lengths along their taper, wherein the optical elements are aligned so that subelements having a greater length face the first side, and so that subelements having a lesser length face the second side, wherein a light entry area is formed by the first side of the light transmission element and/or a light exit area is formed by the second side of the light transmission element; and wherein the optical actuator unit includes:
  a light transmission element, wherein the light transmission element includes:
    the sequence of multiple optical elements situated in the form of the layer, wherein the layer forms the first side and the second side, which face away from one another; and
    the respective optical element, including the pair of subelements which each extend from a geometrically essentially identical base in a tapering manner and which face one another with their bases and extend with different lengths along their taper, wherein the optical elements are aligned so that subelements having the greater length face the first side, and so that subelements having the lesser length face the second side;
  wherein the light entry area is formed by the second side of the light transmission element and/or the light exit area is formed by the first side of the light transmission element.

* * * * *